3,355,074
SYSTEM FOR REMOVING STOCKINGS
FROM FORMS
Grant H. Brewin, Souderton, and Herbert P. Scott, Hatboro, Pa., assignors to Proctor Hydro-Set Company, Philadelphia, Pa., a corporation of Pennsylvania
Filed Mar. 1, 1965, Ser. No. 436,040
34 Claims. (Cl. 223—112)

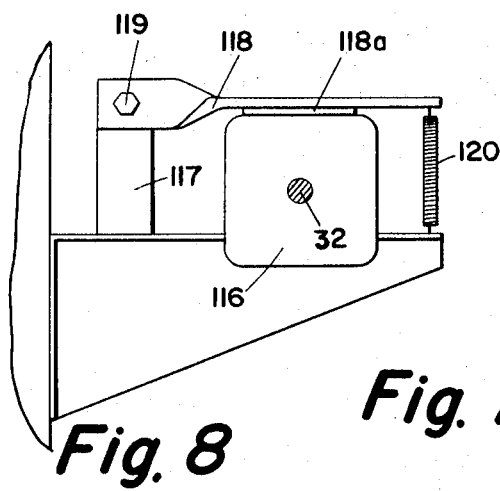
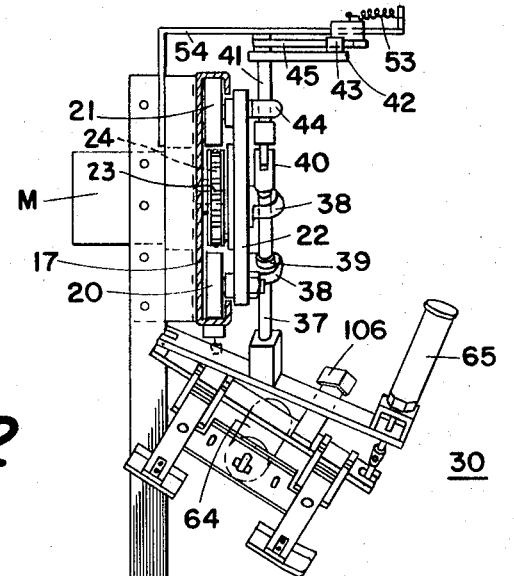
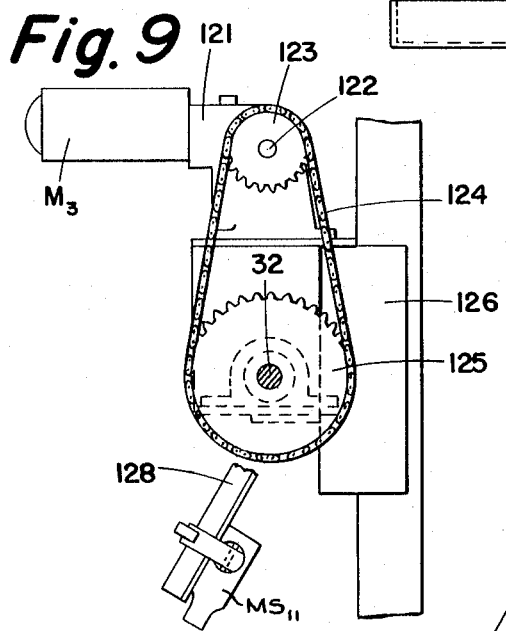
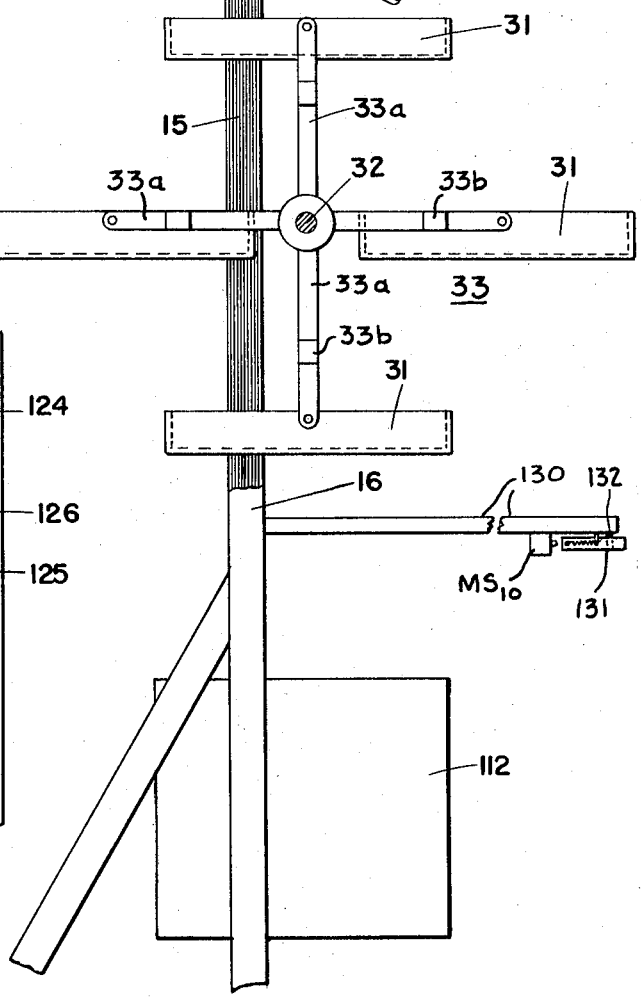

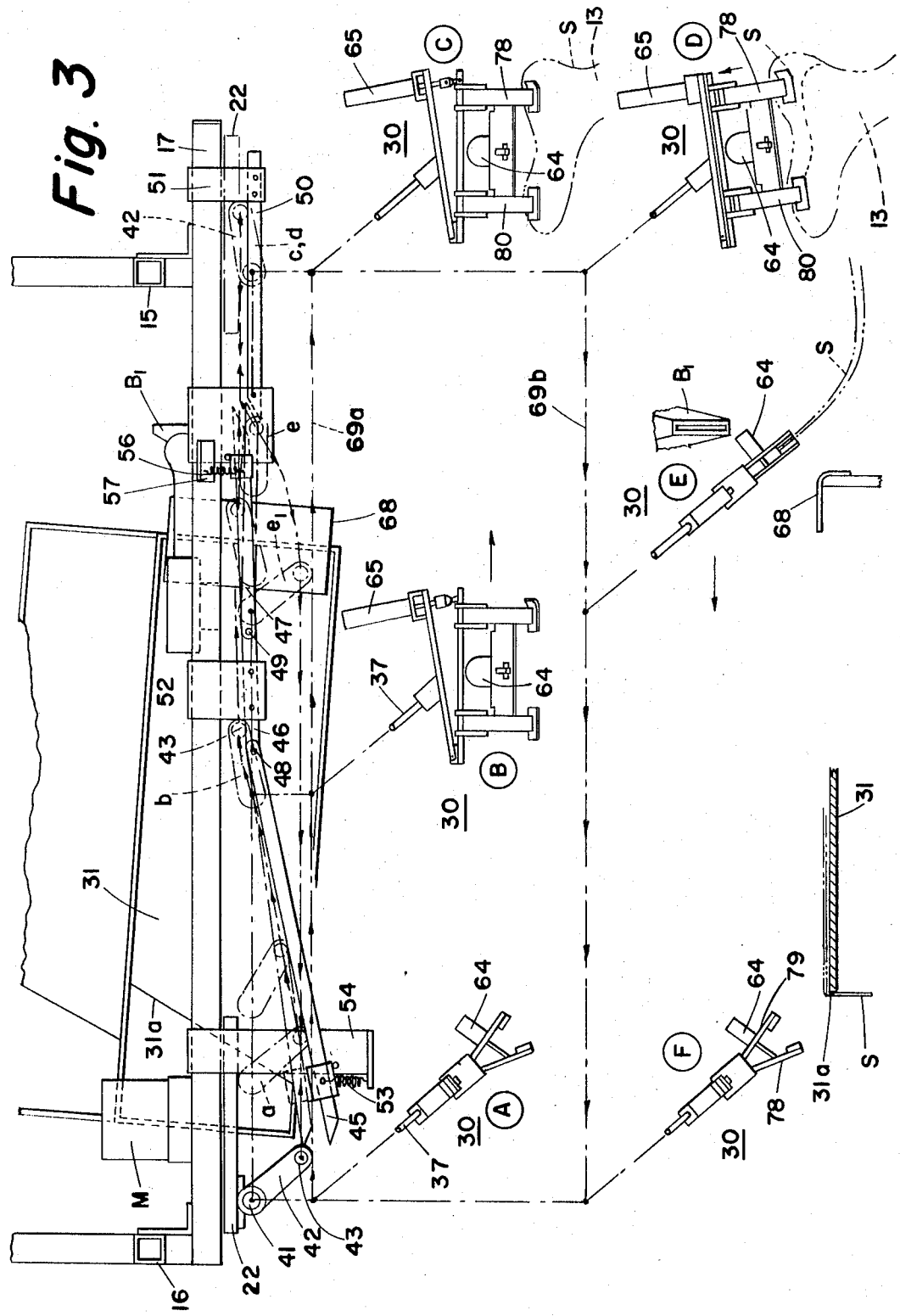

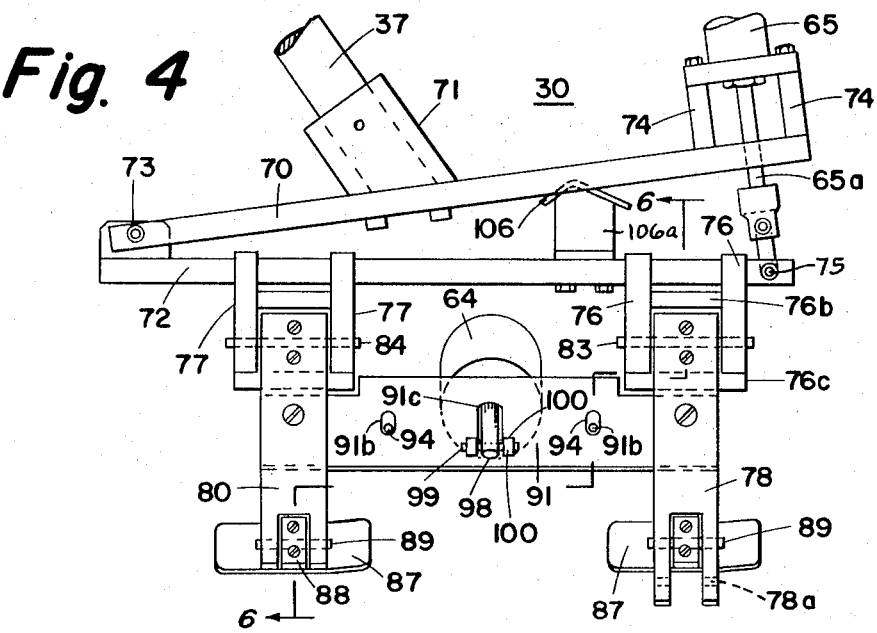
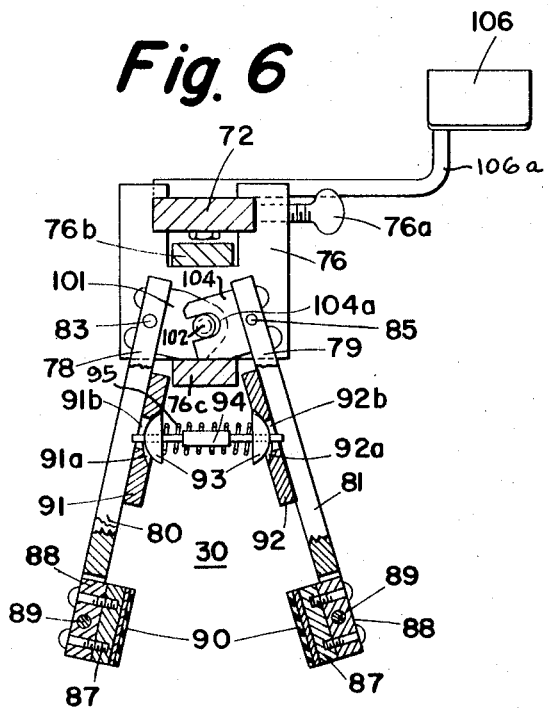
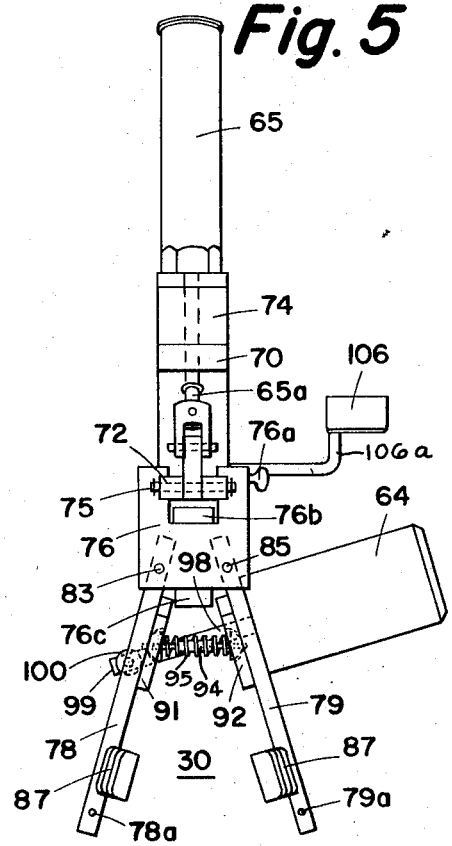

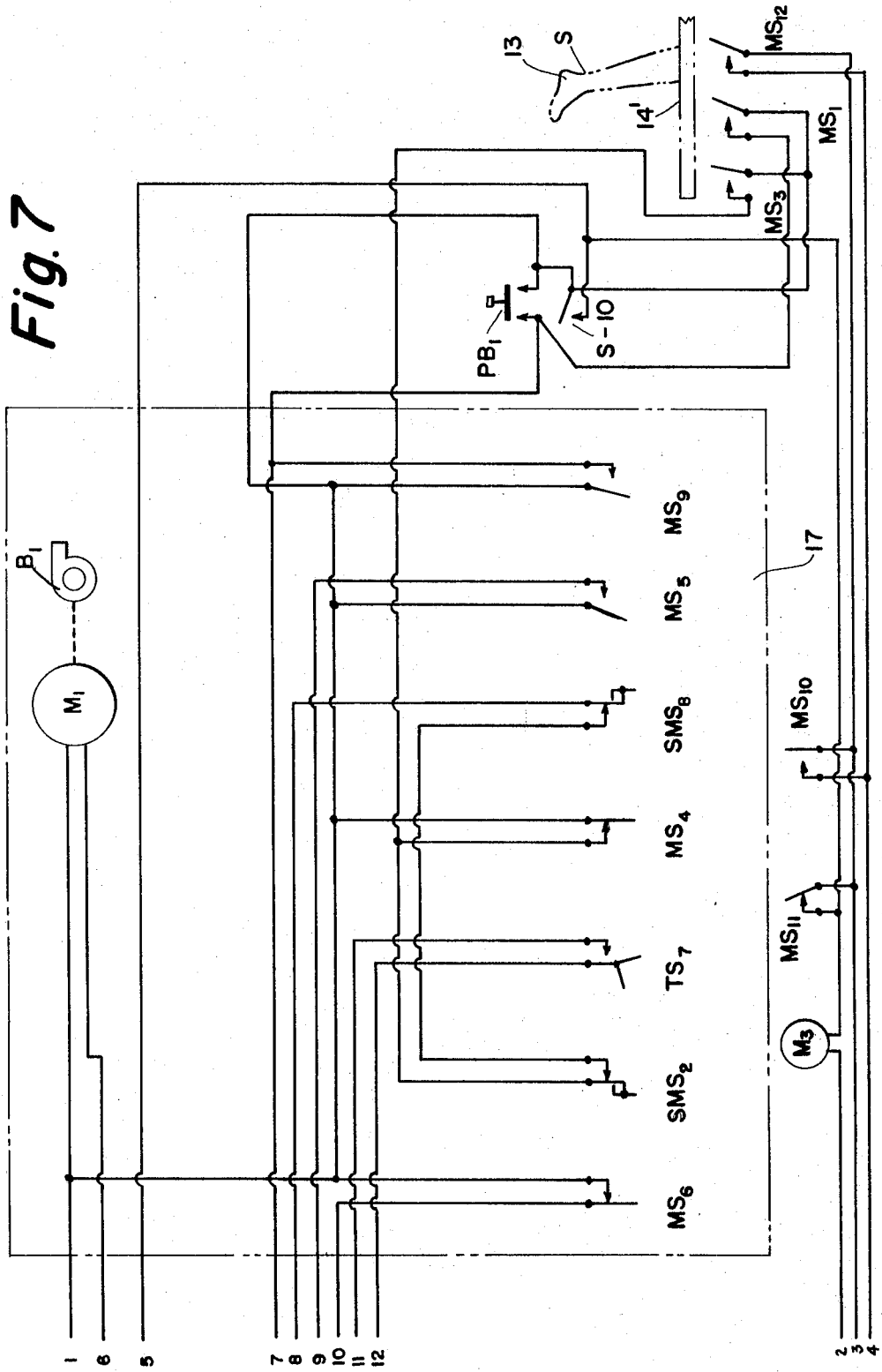

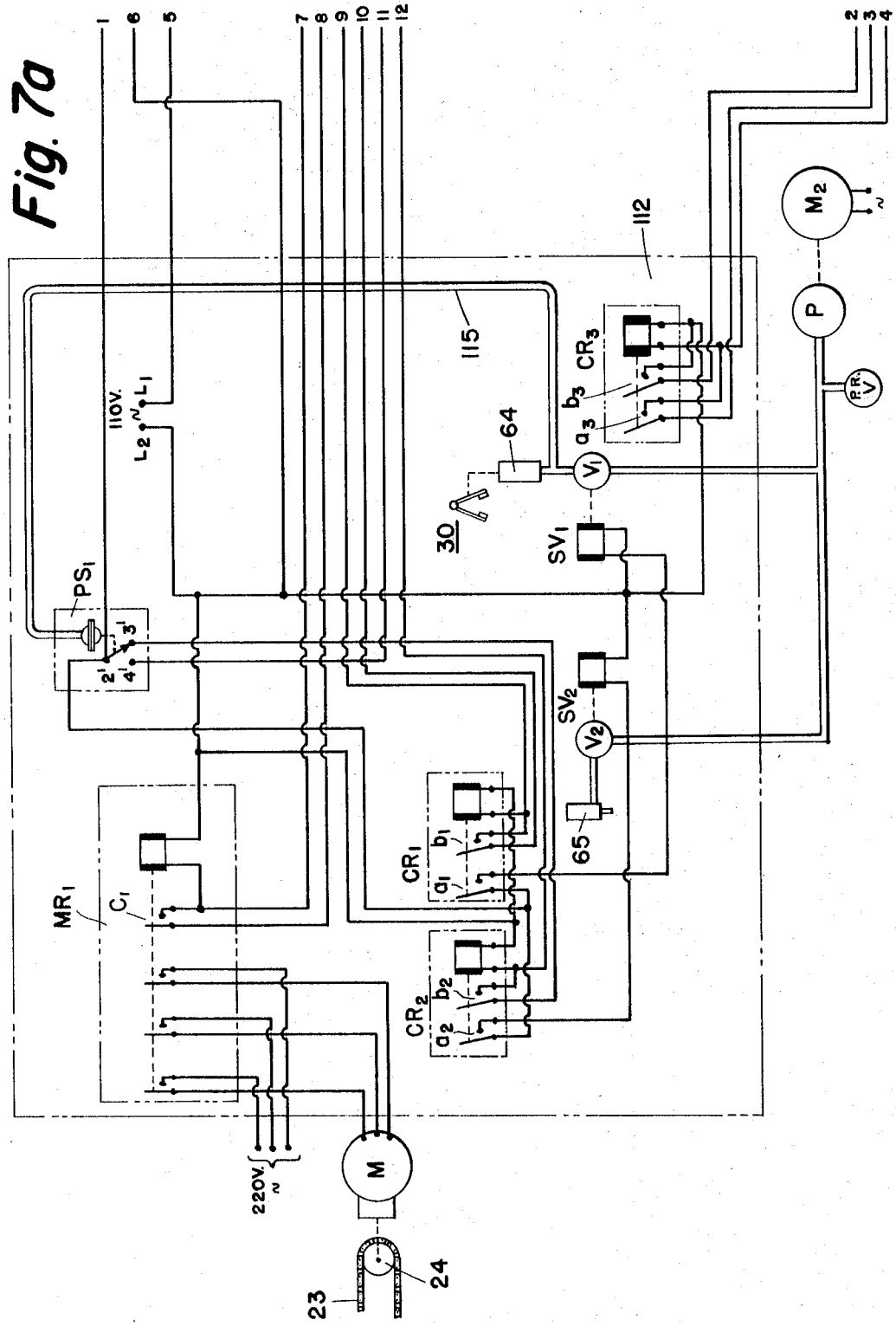

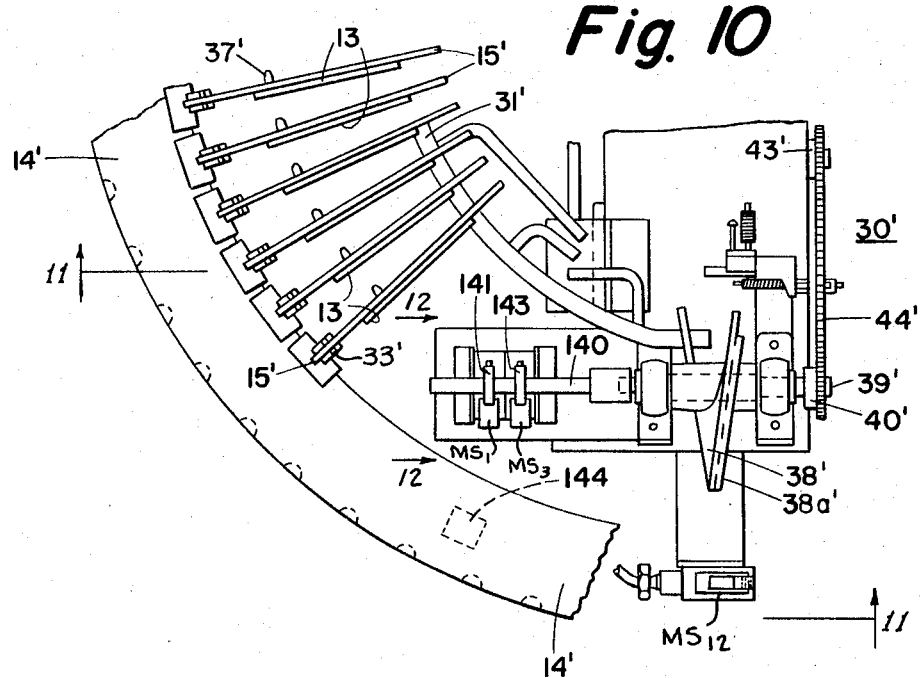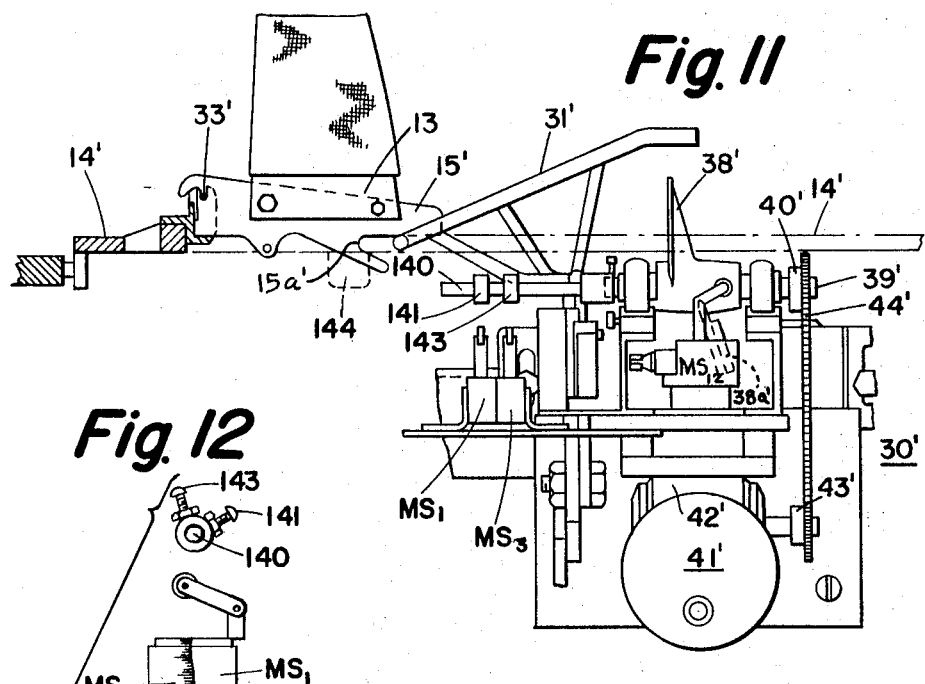

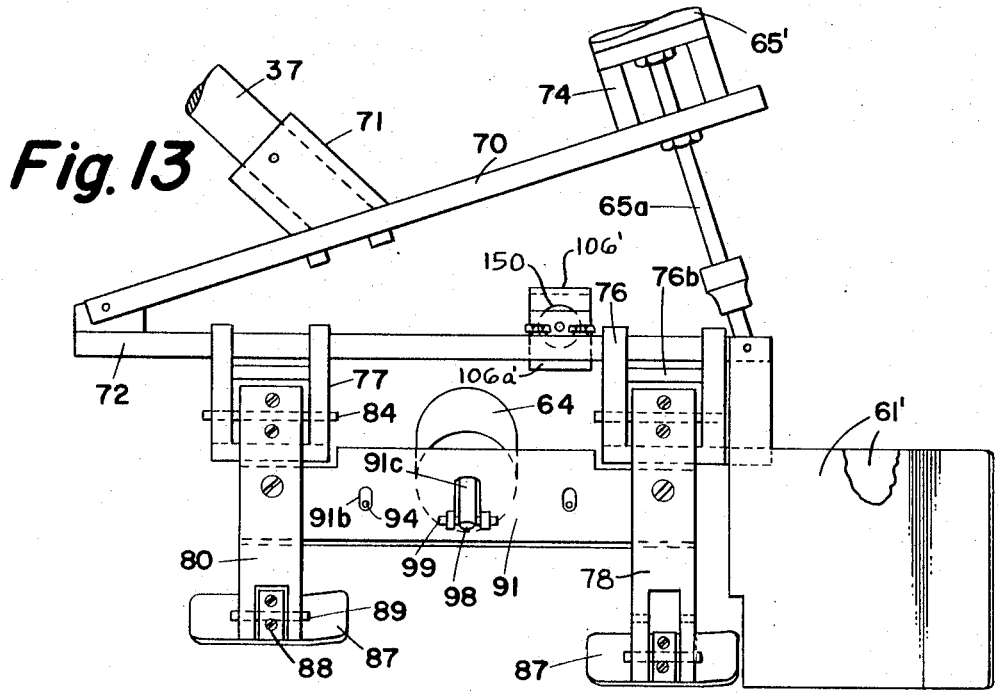
*Fig. 13*
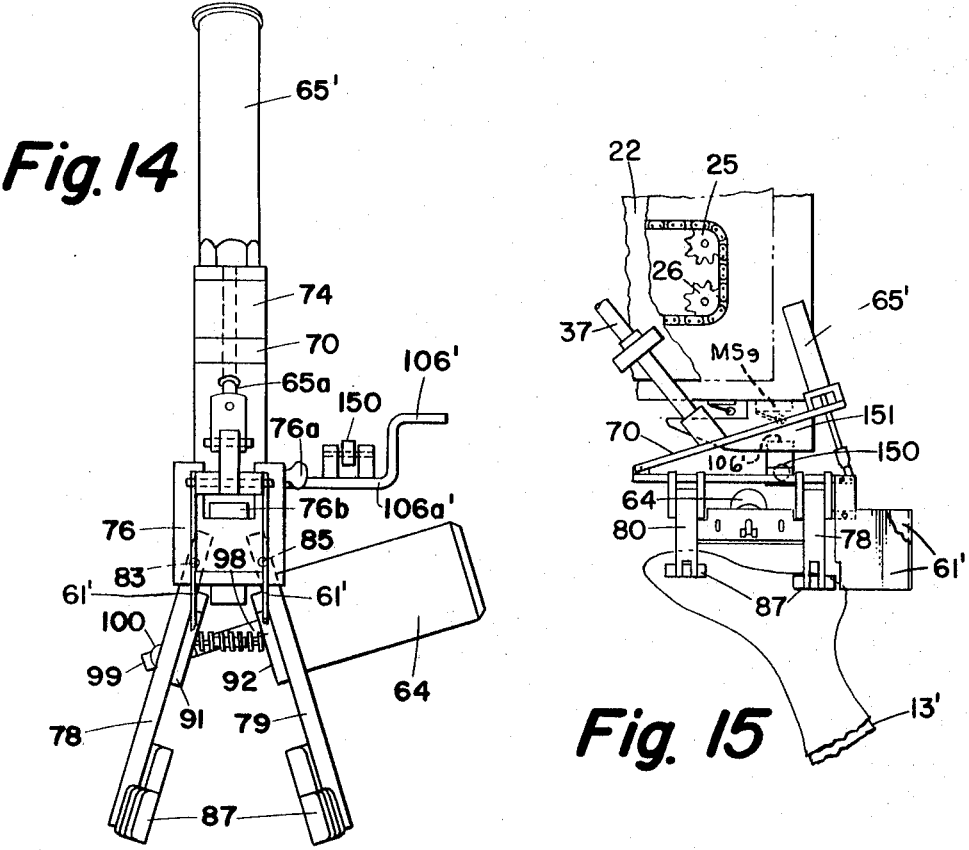
*Fig. 14*
*Fig. 15*

ABSTRACT OF THE DISCLOSURE

A method and apparatus for removing hosiery or stockings from non-horizontal forms and stacking the hosiery in predetermined piles. The apparatus includes stocking gripping means which is guided through a predetermined path to remove the stockings in succession from forms and stack the stockings in the flat on a substantially horizontal surface.

This invention relates to a system for removing stockings from forms and has for an object an improved method of and apparatus for removing stockings from forms and stacking them in predetermined piles.

In the hosiery industry, it is the normal practice to place nylon stockings of both the flat knit full-fashion type and the circular knit seamless type on individual forms or boards to receive the various treatments during the manufacturing process. Such treatments include dyeing and finishing, setting and drying. These treatments make it necessary to place the stockings on one set of forms for certain treatments and then strip them off. While such removal or stripping operations have heretofore been proposed to be performed automatically, such proposals have left something to be desired and, thus, the conventional practice as to such stripping operations has been to have them performed manually by an operator. In view of this, the speed of the operator has determined the output for the hosiery-treating machines. Various arrangements have been devised in the past to move the forms to assist the operator in the loading and stripping operations. One of the preferred prior arrangements is the form movement control system disclosed in Brewin Patent No. 3,091,377. In such a system a plurality of vertical hosiery forms are pivotally mounted at their lower ends on a movable carriage for automatic movement of the forms about a horizontal axis to and from a tilted loading or stripping position. With this arrangement, the stocking forms are automatically moved in sequence to the same position at the loading station and after a stocking has been placed on the form or removed therefrom, as the case may be, the carriage moves with respect to the loading station so that a succeeding form is placed in position at the loading station. While such system has been a substantial improvement over other prior systems and has simplified the work of the operator, nevertheless, such system has been dependent upon the operator in loading and removing stockings from the forms.

The present invention has eliminated the need for an operator manually to remove or strip stockings from the forms and provides an improved method of and apparatus for not only removing stockings from forms but also for stacking them in predetermined piles after removal for ease in future handling. In accordance with the present invention, there is provided a method of and apparatus for removing stockings from forms wherein each stocking is gripped at the toe and heel of the foot portion and then the heel is pulled lengthwise of the form until the heel is free of the form. Thereafter, both the toe and heel are pulled concurrently away from the form and the toe and heel of the stocking are turned through an angle toward the horizontal. The leg portion of the stocking is deflected to bring the leg portion into a substantially horizontal plane and the leg portion is pulled onto a substantially horizontal surface. The grip on the toe and heel of the foot portion is then released. With this improved system, the stockings are removed in succession from the forms and are stacked in the flat on the horizontal surface. In accordance with one aspect of the invention, the foot portion is dropped beyond the horizontal surface so that at least the toe of the foot portion hangs substantially vertically below the adjacent leg portion. By dropping the foot portion in this manner, it is assured that the stack of stockings will remain flat and neat for ease in subsequent handling. In accordance with a further aspect of the invention, a constant uniform control over the stockings as they are removed from the forms is maintained by a controlled air stream directed against the stockings so that they will not be subject to deflection from their desired path of movement due to intermittent and uncontrolled gusts of air which are frequently encountered in hosiery mills.

In accordance with a further aspect of the invention, there is provided apparatus for removing stockings from forms and stacking them in predetermined piles. The apparatus includes a horizontal support and a carriage movable along the horizontal support. Driving means for the carriage is provided and stocking gripping means is carried by the carriage. The apparatus also includes a control circuit for the carriage driving means and the gripping means, the control circuit including a plurality of switch means carried by the horizontal support and connected in circuit with the control circuit. The carriage carries cam means for operating the switch means to control movement of the carriage and the gripping means along the horizontal support. The gripping means, under the control of the control circuit, is adapted to remove stockings in succession from a plurality of forms and stack them in the flat in piles positioned beneath the horizontal support. The stockings preferably are placed on trays which are movable into and out of loading position.

In accordance with a further aspect of the invention, provision is made for automatically counting the number of stockings piled on any tray.

In accordance with a further aspect of the invention, there is provided a novel gripper assembly for removing stockings from forms. Provision is made for controlling the movement of the gripper assembly in accordance with a predetermined path. The gripper assembly is adapted to remove stockings from forms of different shapes.

For a more detailed description of the invention and for further objects and advantages thereof, reference is to be had to the following description taken in conjunction with the acompanying drawings in which:

FIG. 2 is a left-hand vertical view taken along the lines 2—2 in FIG. 1;

FIG. 3 is a top plan view of the system shown in FIG. 1 including a diagrammatic illustration of the gripper assembly in its various positions throughout its travel during one cycle of the system;

FIG. 4 is a front elevational view of the gripper assembly;

FIG. 5 is a right-end elevational view of the gripper assembly in FIG. 4;

FIG. 6 is a vertical sectional view taken along the lines 6—6 in FIG. 4;

FIG. 7 is a schematic diagram showing part of the control circuit for the system shown in FIGS. 1–3;

FIG. 7a is a schematic diagram showing the additional circuitry which cooperates with the circuitry shown in FIG. 7 for controlling the system shown in FIGS. 1–3;

FIG. 8 is an end view of the tray locating device taken along the plane 8—8 in FIG. 1;

FIG. 9 is an end view of the tray drive mechanism taken along the plane 9—9 in FIG. 1;

FIG. 10 is a fractional top plan view of a form holder and form movement control mechanism;

FIG. 11 is a front elevational view of FIG. 10;

FIG. 12 is a vertical view taken along the plane 12—12 in FIG. 10;

FIG. 13 is a front elevational view of a gripper assembly similar to that shown in FIG. 4 and adapted to provide an increased lift of the heel portion of the stocking to accommodate a different shaped form;

FIG. 14 is a right-end elevational view of the gripper assembly in FIG. 13; and

FIG. 15 is a fractional view of the horizontal frame shown in FIG. 1 and including cam means for cooperation with the gripper assembly shown in FIGS. 13 and 14.

Figure 1:
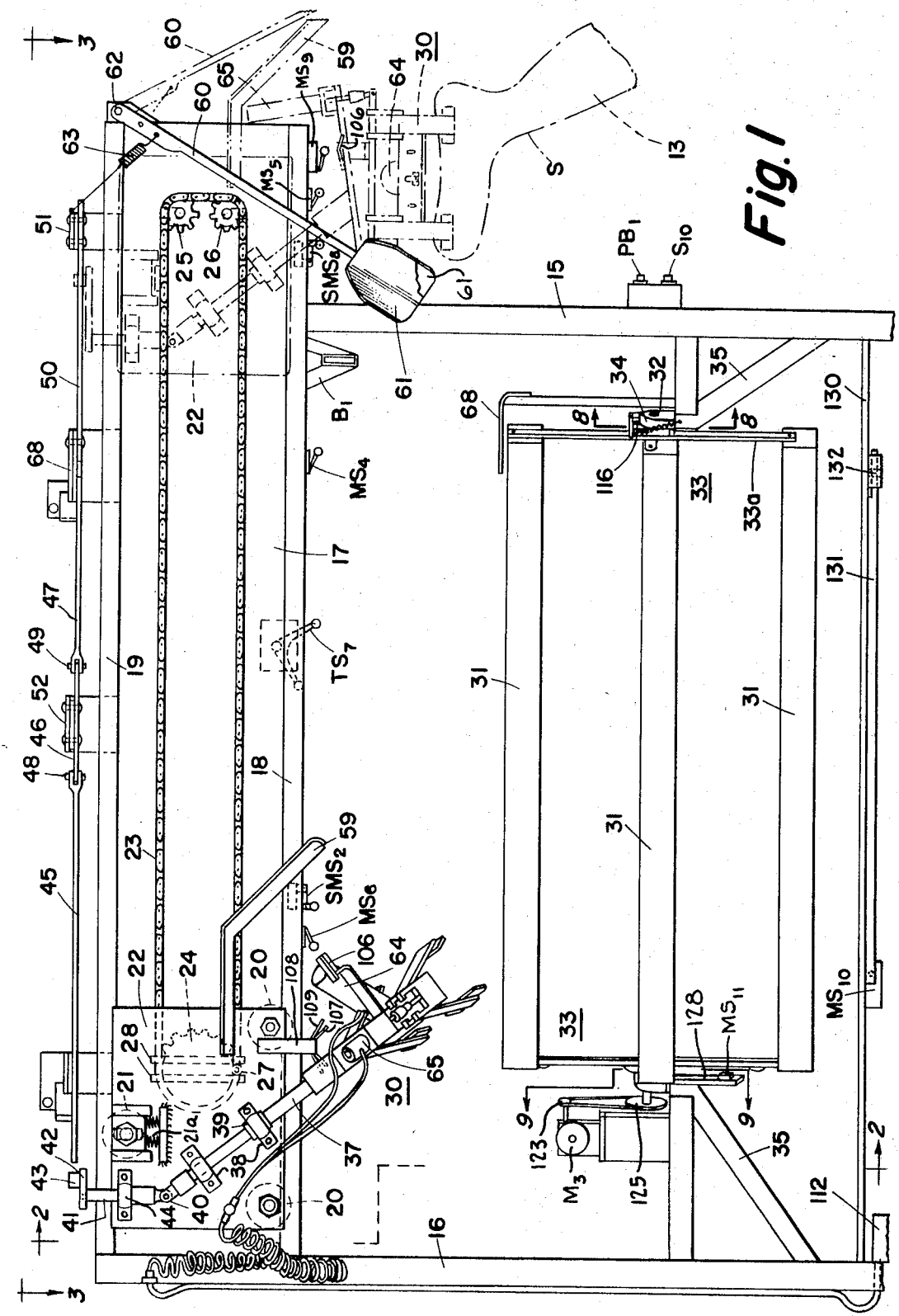
FIG. 1 is a front elevational view of a system embodying the present invention.

Referring to FIG. 1, it will be seen that the present invention, while not limited thereto, has been illustrated in connection with removal of stockings S having a foot portion including a heel and toe and a leg portion from forms 13. Such stocking forms 13 may be carried by any suitable type of form movement apparatus whether it be the straight-line type, where the forms are arranged in a straight line one after another, or in the parallel type, where the forms are arranged side-by-side and are tilted or are adapted to tilt to a position out-of-line with the other forms, or where the forms are arranged on a circular turret as in the aforesaid Patent 3,091,377. For purposes of clarity in the description, it will be assumed herein that the forms are arranged on a circular turret as in the aforesaid patent and as later described in connection with FIGS. 10-12.

As may be seen in FIG. 1, there is provided a pair of vertical supports 15 and 16 which support a horizontal frame 17. The frame 17 supports a pair of lower and upper tracks 18 and 19 which, respectively, are adapted to engage the wheels 20 and 21 of a carriage 22. The upper wheel 21 is biased against the upper track 19 by means of a pair of springs 21a. The carriage 22 is adapted to be driven from one end of the tracks 18 and 19 to the other by means of a sprocket chain 23 which passes over a driven sprocket 24 at one end of the horizontal frame 17 and a pair of idler sprockets 25 and 26 at the opposite end of the horizontal frame 17. The sprocket 24 is driven by a motor M which is mounted on the rear of the horizontal frame 17 as shown in FIG. 2. The chain 23 is provided with a roller 27, FIG. 1, which is adapted to be received between a pair of vertical members 28 carried by the rear side of the carriage 22. It will be seen that the vertical members 28 are of sufficient length to maintain the roller 27 therebetween regardless of its position along the path of travel of the chain 23. Thus, as the chain 23 rotates due to the drive from sprocket 24, the roller 27 on chain 23 will move against one or the other of the vertical members 28 and cause the carriage 22 to move back and forth from one end of the tracks 18 and 19 to the other.

The carriage 22 supports a stocking gripper assembly 30 which is adapted to move from the left-hand end of the system as shown in full line in FIG. 1 to the right-hand end as shown in phantom line in FIG. 1 where it grips a stocking S on one of the forms 13. The stocking S is removed from the form in a particular manner as later will be described in connection with FIG. 3 and is placed on the top one of the stocking trays 31. The trays 31 are supported at the outer ends of the spokes on the pair of wheels 33, the latter having their shaft 32 supported by bearings 34 carried by brackets 35 which are secured to the vertical supports 15 and 16. It will be noted, FIG. 3, that the bottoms of the trays 31 are shorter than the stockings and one end 31a of the bottoms are cut away at an acute angle to permit at least the toe of the foot portion of the stockings to drop therethrough as later to be described. The trays 31 may be automatically moved into stocking receiving or loading position as later to be described.

The gripper assembly 30, the details of which will be described hereinafter, is mounted on a shaft 37 which is rotatably carried in a pair of pillow blocks 38. A collar 39 is secured to the shaft 37 adjacent the lower pillow block 38, FIG. 1, to limit the downward movement of the shaft 37. The upper end of the shaft 37 is connected to one-half of the universal joint 40, the other half of which is connected to a shaft 41 which is journaled in a pillow block 44. The upper end of the shaft 41 has secured thereto an arm 42 which supports a cam roller 43. The cam roller 43 is adapted to engage a multi-section cam track for control of the angular position of the gripper assembly 30 as now to be described in connection with FIG. 3.

As may be seen in FIGS. 1 and 3, the cam track carried by the horizontal frame 17 comprises a plurality of cam track sections 45, 46 and 47 which are interconnected to the free end of cam track section 45 and to a stasection 50 which is carried in a fixed position by a bracket 51 at the right-hand end of the horizontal frame 17. The cam track section 46, likewise, is carried in fixed position by means of a bracket 52 and cam track sections 45 and 47 are, respectively, pivoted to the opposite ends of cam track section 46. The left-hand end or free end of the cam track section 45 is biased to its full line position as shown in FIG. 3 by means of a spring 53 which is connected to the free end of cam track section 45 and to a stationary bracket 54 carried by the horizontal frame 17. Likewise, the right-hand end or free end of cam track section 47 is biased to the full line position shown in FIG. 3 by means of a spring 56 which is connected to a bracket 57 on horizontal frame 17 and to the free end of the pivoted cam track section 47. The free end of pivoted cam track section 47 is adapted to cooperate with the adjacent end of the stationary cam track section 50 to provide a gate for the cam roller 43 in a manner now to be described.

The operation of the system will now be described with regard to FIG. 3. The cycle of the system is adapted to start with the gripper assembly 30 shown in position A in FIG. 3. At this time in the cycle the pivoted cam track section 45 is in its full line position and the cam roller 43 and its associated arm 42 are adapted to move to the right as viewed in FIG. 3 from the full line position into the succeeding phantom line positions a–d. As the carriage 22 moves to the right along the horizontal frame 17, it carries the gripper assembly 30 and the arm 42 to the first phantom line position indicated by position a. At this time the roller 43 engages the inner edge of the pivoted cam track section 45 and causes the arm 42 to pivot about its shaft 41 thereby turning the gripper assembly 30 about its shaft 37 until the gripper assembly assumes the position shown at B. At this time the lever 42 and its cam 43 have assumed the position b as shown in FIG. 3. The cam roller 43 continues along the inner edge of the stationary cam track section 46 which is still slightly inclined as shown in FIG. 3 and the gripper assembly 30 continues to advance along with the carriage 22 in the position as shown in B. The gripper assembly 30 continues to maintain this angular position with the gripper fingers open and pointing downwardly until the gripper assembly 30 arrives at the end of its horizontal travel as shown by position C in FIG. 3 and by the phantom line position as shown in FIG. 1.

Prior to arrival of the gripper assembly 30 at position C, a deflector 59, FIG. 1, carried by the carriage 22 has moved into engagement with form stabilizing means comprising a pivoted guide member 60 having bifurcated ends 61 which are adapted to be moved into position on opposite sides of the foot portion of the forms 13 by the deflector 59. The bifurcated ends 61 of member 60 are adapted to steady the form and insure that it will be in proper position for engagement by the gripper assembly 30. As may be seen in FIG. 1, the guide member 60 is pivoted to the horizontal frame 17 at pivot 62 and the guide member 60 is biased to the full line position as shown in FIG. 1 by means of a tension spring 63. When the deflector 59 engages the pivoted member 60, it moves the latter to the phantom line position shown in FIG. 1 and out of the path of the gripper assembly 30.

After the gripper assembly 30 has moved into position with the heel and toe of the foot portion of the stocking as shown by position C in FIG. 3, an actuator 64, which may be in the form of an air cylinder, is operated to close the gripper fingers and then a similar actuator 65 is operated to raise the heel of the stocking S and free it from the heel of the form 13 as shown by the position of the gripper assembly 30 at position D. At this time the lever 42 and cam 43 are at position $c, d$. The carriage 22 then moves in reverse direction, thus moving the lever 42 and the cam roller 43 also in reverse direction to the left along the inside edge of the stationary cam track section 50. When the cam roller 43 reaches the left-hand end of the stationary cam track section 50, it will move off the end thereof and through the gate between the left-hand end of stationary cam track section 50 and the right-hand end of the pivoted cam track section 47. At this time the lever 42 and cam roller 43 will assume the phantom line position indicated by $e$ and the gripper assembly 30 will rotate through approximately 90° to the position shown at E, FIG. 3. When the cam roller 43 moves through that gate in the cam track, the weight of the gripper assembly 30 causes the latter to drop to the position indicated at E and it continues in that angular position with the stocking now moving in a horizontal plane over the deflector 68 and onto the horizontal surface of the top tray 31. After the cam roller 43 passes through the gate and beyond the position indicated by $e$, it will assume the position shown in phantom line at $e_1$ and it will maintain this same angular position until it arrives back at its full line position F as shown at the left-hand end of FIG. 3. The cam roller 43, during a substantial portion of this movement, will be out of engagement with the cam track sections 45–47 until it approaches the left-hand end of the pivoted cam track section 45. At this time the cam roller 43 will engage the outer edge of the cam track section 45 and cause the latter to be moved from its full line position to the phantom line position until the roller 43 moves beyond the left-hand end of the cam track section 45. When this occurs, the cam track section 45 will again assume the full line position as shown in FIG. 3. When the gripper assembly 30 arrives at the left-hand end of the apparatus as shown at F in FIG. 3, the fingers of the gripper assembly 30 are adapted to be opened to drop the foot portion of the stocking S so that the latter will hang down vertically below the horizontally supported leg portion of the stocking on tray 31 as shown in FIG. 3.

After one stocking has been removed from a form 13, a second form 13 with a stocking thereon is moved into position and the cycle of the system is repeated with the gripper assembly 30 moving to the right as indicated by the arrows 69a in FIG. 3, gripping a stocking at position C at the right-hand end of the apparatus and then moving to the left as indicated by the arrows 69b to complete a cycle at position F.

As may be seen in FIG. 4, the gripper assembly 30 comprises a hinge device including an upper member 70 having attached thereto a socket 71 which is adapted to receive the outer end of the shaft 37. The lower member 72 of the hinge device is pivoted to the upper member 70 at one end thereof by a pivot 73. The actuator 65, for the hinge device, has been illustrated in the form of an air cylinder or equivalent. The air cylinder is supported at the opposite end of member 70 by support blocks 74 and the plunger 65a of actuator 65 is pivotally connected at 75 to the opposite end of member 72. The lower member 72 supports, in depending relation, two pairs of support blocks 76 and 77 which, in turn, support two pairs of gripper fingers 78–81, FIG. 6.

As may be seen in FIGS. 4–6, the support blocks 76 support gripper fingers 78 and 79 while the support blocks 77 support gripper fingers 80 and 81. Gripper fingers 78 and 80 are identical in construction while gripper fingers 79 and 81, likewise, are identical in construction. The support blocks 76 are secured to each other by means of upper and lower cross members 76b and 76c and the support blocks 76 are adjustably secured to the member 72 by means of thumb screws 76a, FIGS. 5 and 6. As may be seen in FIG. 4, the gripper fingers 78 and 80 are pivotally secured, respectively, to the support blocks 76 and 77 by means of pivot pins 83 and 84. Similarly, the gripper fingers 79 and 81 are, respectively, pivoted to the support blocks 76 and 77 by pivot members. Pivot member 85 for gripper finger 79 is shown in FIGS. 5 and 6. A similar pivot for gripper finger 81 is provided, although it is not shown in the drawing. The gripper fingers 78 and 79 are adapted to grip the heel of the foot portion of the stocking while the gripper fingers 80 and 81 are adapted to grip the toe portion of the stocking. It will be noted that the lower ends of the gripper fingers 78–81 are provided with gripper pads 87 which are of identical construction. The gripper pads 87 include a center block member 88 through which extends a pin 89, the latter extending into the bifurcated ends of the lower extremities of the gripper fingers 78–81. The gripper pads 87 are curved outwardly at their outer ends as may be seen in FIGS. 4 and 5 and they are faced with a resilient material such, for example, as rubber 90, FIG. 6, to avoid damage to the stockings. The gripper pads 87 carried by the gripper fingers 78 and 79, which are adapted to grip the heel portion of the stocking, may be adjusted lengthwise of these gripper fingers as indicated by the second or outer hole positions 78a and 79a for receiving the cross pins 89, FIGS. 4 and 5. This provides adjustment in the gripper assembly 30 to accommodate different shapes of stocking forms as later described in connection with FIGS. 13–15.

The gripper fingers 78 and 80 are tied together by means of a cross member 91 while the gripper fingers 79 and 81 are tied together by means of a cross member 92. The inner faces of the members 91 and 92 are provided with arcuate surfaces 91a and 92a, respectively, having elongated openings 91b and 92b at the bottom thereof, FIG. 6. The arcuate surfaces 91a and 92a are adapted to provide bearing seats for bearing members 93, 93. The bearing members 93 are shaped in the form of segments of a circular disc with their curved surfaces being adapted to ride in the arcuate surfaces 91a and 92a with the curved surfaces of members 93 having a smaller radius. The members 93 have openings therethrough through which extend the outer ends of a pin member 94 which is adapted to carry a coil spring 95. As may be seen in FIG. 4, two pins 94 are used and, thus, two springs 95, likewise, are utilized. The springs 95 are adapted to abut the spaced bearing members 93 as shown in FIG. 6 and hold the latter in the bearing seats or arcuate surfaces 92a and 91a. The springs 95 are adapted to apply a biasing force to the fingers of the gripper assembly 30 to bias the fingers 78–81 in an open position as shown in FIGS. 5 and 6.

The gripper fingers 78–81 of the gripper assembly 30 are adapted to be moved to closed position by means of the actuator 64, preferably in the form of an air cylinder similar to the actuator 65. As may be seen in FIG. 5, the actuator 64 is carried by the cross member 92 with the actuator plunger 98 extending therethrough and also through an opening in the other cross member 91. The outer end of the plunger 98 is provided with a cross pin 99, the outer ends of which are adapted to carry a pair of rollers 100. As may be seen in FIG. 4, the slot 91c through member 91, is sufficiently large to permit the rollers 100 to move relative to the outer surface of member 91 as the plunger 98 moves relative to the cylinder or housing of the actuator 64. The upper ends of gripper fingers 80 and 78 are provided with mounting blocks 101, FIG. 6, which are adapted to carry cam rollers 102. The mating gripper fingers 79 and 81 are provided at their upper ends with cam blocks 104 having cam surfaces 104a which are adapted to receive the cam rollers 102 as shown in FIG. 6. With this arrangement, it will be seen in FIG. 4 that as the actuator 64 moves its plunger 98 to bring the rollers 100 against the cross member 91, the gripper fingers 78 and 80, connected to the cross member 91, will be caused to pivot about their pivots 83 and 84. Since both gripper fingers 78 and 80 are tied together by the cross member 91, it will be seen that both fingers 78 and 80 will move concurrently. As the gripper fingers 78 and 80 rotate about their pivots 83 and 84, the cam rollers 102, FIG. 6, carried by the blocks 101 on the respective gripper fingers, will be caused to rotate about the pivots 83 and 84 and this action will cause the mating cam blocks 104, carried by the cooperating fingers 79 and 81, likewise, to pivot about their respective pivots, only pivot 85 for finger 79 being shown. This action causes the gripper fingers 79 and 81 to move toward their mating gripper fingers 78 and 80 and since the gripper fingers 79 and 81 are tied together by the cross member 92, it will be assured that all four gripper fingers 78–81 will operate concurrently even though there is a single actuator 64 for opening and closing the gripper fingers 78–81. The gripper assembly 30 also carries a cam 106 for operating a control switch as later to be described.

While the general operation of the system has been described, reference will now be made to FIGS. 7 and 7a for a more detailed description of the control system. Referring to FIG. 7, the phantom line rectangle has been illustrated as corresponding schematically to the horizontal frame 17 and parts carried thereby of FIG. 1 and, thus, has been identified with the same reference character. As may be seen in FIG. 1, there is a series of seven electrical switches arranged across the lower surface of the horizontal frame 17 extending from left to right. The first switch is a conventional microswitch $MS_6$, the contacts of which are normally closed. The second switch is a special microswitch $SMS_2$ which also has normally closed contacts. Switch $SMS_2$ differs from switch $MS_6$ in that the former includes a pivoted actuator which is effective to operate the switch contacts only when the actuator is engaged in one direction but not in the reverse direction. The third switch is a toggle switch $TS_7$ which is operative between on and off positions as later to be described in connection with FIG. 7. The fourth switch in the series is a conventional microswitch $MS_4$ which has normally closed contacts and is similar to microswitch $MS_6$. The fifth switch is a special microswitch $SMS_8$ which has normally closed contacts and is of the same type as microswitch $SMS_2$. However, the contacts are operated in reverse direction. The next switch in the series is another conventional microswitch $MS_5$ which has normally open contacts and the last switch in the series is microswitch $MS_9$ which also has normally open contacts and is of conventional construction.

Each of the foregoing electrical switches of the series is shown schematically in FIG. 7. The toggle switch $TS_7$ is adapted to be actuated by means of a cam 107 carried by a bracket 108 which, in turn, is carried by the carriage 22, FIG. 1. A second cam 109 is also carried by bracket 108 and is spaced to one side of cam 107. The came 109 is so positioned as to be in alignment with and sequentially engage the microswitches $MS_6$, $SMS_2$, $MS_4$, $SMS_8$ and $MS_5$. The microswitch $MS_9$, at the right-hand end of frame 17, is adapted to be actuated by the cam 106 which was previously described as being carried by the gripper assembly 30.

The horizontal frame 17 also supports a blower $B_1$, FIG. 1, which is adapted to be driven from an electric motor $M_1$, FIG. 7. The blower $B_1$ is so positioned in the system as to put a controlled stream of air in the path of the stocking as it is removed from the form 13 to maintain the stocking against the deflector 68 preparatory to being placed on the tray 31. This is best seen in FIG. 3. As the stockings S are made of very light weight material, their movements are greatly influenced by any uncontrolled or disturbing air currents. By utilizing a controlled air stream from the blower $B_1$ and directing the air stream against the stockings S in foregoing controller manner, it will be assured that the stockings will not be subject to deflection from their desired path of movement due to intermittent and uncontrolled gusts of air which are frequently encountered in hosiery mills.

The control equipment for the gripper assembly 30 of FIG. 1 is contained within the control box 112, the contents of which is illustrated schematically in FIG. 7a. As may be seen in FIG. 7a, the control box 112 includes a motor relay $MR_1$ which is adapted to be connected to a suitable voltage supply, for example 220 volts A.C., 3-phase, 60 cycle, for energizing the drive motor M, FIGS. 2 and 3. The drive motor M includes a gear box of the gear reduction type having an output shaft to which is connected the sprocket 24 for chain 23 for actuating the carriage 22 which carries the stocking gripper assembly 30 of FIG. 1. The control box 112 of FIG. 7a also houses a pair of control relays $CR_1$ and $CR_2$ which, in turn, control the solenoid valves $SV_1$ and $SV_2$ which, respectively, control the pneumatic cylinders 64 and 65 on the stocking gripper assembly 30. The pressure for the pneumatic cylinders 64 and 65 is supplied by means of a pump P, FIG. 7a, which is driven by a motor $M_2$. A pressure relief valve PRV is in the pneumatic circuit between the pump P and the solenoid valves $SV_1$ and $SV_2$ to limit the pressure supplied to these valves. A pressure switch $PS_1$ is also in the pneumatic circuit with the solenoid valves $SV_1$ and $SV_2$ and its operation will be hereinafter described. The relays and solenoids in the control box 112 are adapted to be energized from a suitable voltage source $L_1$, $L_2$ such as 110 volts A.C., FIG. 7a.

Referring to FIGS. 7 and 7a, it will be seen that the conductors at the left-hand end of FIG. 7 and the conductors at the right-hand end of FIG. 7a have been identified with corresponding reference characters to indicate that these are the same conductors in both figures and that FIGS. 7 and 7a are to be joined together at that location. As may be seen in FIGS. 7 and 7a, the conductors 1 and 6 are connected to the motor $M_1$ for blower $B_1$ and conductors 5 and 6 are connected to opposite sides of the $L_1$, $L_2$ voltage supply in FIG. 7a. The blower $B_1$ is of the continuous duty type and provides a continuous controlled air stream during the removal of the stockings from the forms. To operate the system of FIG. 1, the switch $S_{10}$ is closed manually, thus, connecting $L_1$, $L_2$ to opposite sides of the push button $PB_1$ by way of conductors 5 and 7, FIGS. 7 and 7a, and energizing the motor $M_1$ for blower $B_1$ by way of conductors 5, 10, 1 and 6. It will be noted that the coil of motor relay $MR_1$ is in series circuit with $L_2$ and conductor 7. The system of FIG. 1 may be operated manually by means of an operator pushing the push button $PB_1$ in FIG. 1 which is mounted on the vertical support 15. However, it is preferable that the system be operated automatically by the carriage for the hosiery forms. One example of such carriage or form receiving means is the ring 14' shown in FIG. 7 and identified by reference character 14 in the aforesaid Brewin Patent 3,091,377. The carriage 14' has pivotally mounted thereon a plurality of supports which, in turn, support individual stocking forms 13. As illustrated in FIG. 7, the microswitches $MS_1$ and $MS_3$ are both adapted to be closed by the carriage 14' for the stocking forms 13 when the carriage 14' moves a form 13 to the loading station As the carriage 14' rotates about its central axis to index the forms in succession by the loading station, as described in the aforesaid Patent 3,091,377, the microswitch $MS_1$ is tripped to close the contacts as each form 13 moves to the loading station.

As may be seen in FIG. 7, the microswitch $MS_1$ is in series with switch $S_{10}$, which has now been closed, and is in parallel circuit with the push button $PB_1$. Thus, when the carriage 14' moves a form 13 to the loading station thereby closing the contacts of microswitch $MS_1$, there will be completed a circuit from $L_1$ through conductor 5 and switch $S_{10}$ and, thence, through microswitch $MS_1$ to conductor 7 and, thence, through the coil of motor relay $MR_1$ to the opposite side of the power supply $L_2$. Thus, it will be seen that the closing of microswitch $MS_1$ causes the coil of motor relay $MR_1$ to be energized thereby closing the contacts of the relay $MR_1$ and starting the drive motor M. The motor M, in turn, drives the sprocket 24 which, in turn, drives the chain 23 and the carriage 22 for the gripper assembly 30. As the carriage 22 moves to the right, as shown in FIG. 1, the cam 109 will first engage the actuator of microswitch $MS_6$. As may be seen in FIG. 7, the microswitch $MS_6$ is connected in series in conductor 10 and at one side to conductor 1. When the microswitch $MS_1$ was tripped upon movement of the carriage 14' into position, the coil of motor relay $MR_1$ not only closed the three contacts for the power circuit of motor M, but also closed the contacts $C_1$ thereby completing a circuit from $L_2$ through the coil of motor relay $MR_1$, the contacts $C_1$, the conductor 8 in FIG. 7a and in FIG. 7, through the contacts of microswitch $SMS_8$, through the normally closed contacts of microswitch $SMS_2$, through the normally closed contacts of microswitch $MS_4$ to conductor 10 and, thence, to one side of switch $S_{10}$ and conductor 5 to the other side of the line $L_1$. It will be noted that the actuation of the microswitch $MS_6$ has no effect upon the circuit for the drive motor M.

As the carriage 22 continues to move to the right in FIG. 1 under the operation of drive motor M, the cam 109 will next engage the actuator of the special microswitch $SMS_2$. As schematically illustrated in FIG. 7, the special microswitch $SMS_2$ includes a lower pivot on the actuator section of the switch permitting the latter to be moved by the cam 109 but without operating the normally closed contacts of the switch. Thus, it will be seen that the contacts of switch $SMS_2$ continue to remain closed and the drive motor M continues to be energized thereby moving the carriage 22 further to the right as viewed in FIG. 1.

Upon further movement of carriage 22, the cam 107, carried thereby, engages the toggle switch $TS_7$ thereby closing the contacts of the toggle switch. This operation has no effect upon the system up to the present time. The drive motor M continues to be energized, moving the carriage 22 further to the right until the cam 109 engages the actuator of microswitch $MS_4$. As previously mentioned, microswitch $MS_4$ is in circuit with the coil of motor relay $MR_1$. It will be noted, in FIG. 7, that microswitch $MS_3$ is connected in parallel circuit with microswitch $MS_4$. The microswitch $MS_3$ is adapted to be moved to closed position when a form 13 is at the loading station. If a form 13 is not at the loading station, the microswitch $MS_3$ will remain open and when the cam 109 engages microswitch $MS_4$, the latter will be opened thereby opening the circuit to the motor relay coil and causing the drive motor M to stop. If a form 13 is at the loading station, the microswitch $MS_3$ will be maintained closed and the opening of the microswitch $MS_4$, by the cam 109, will have no effect upon the machine. Thus, it will be seen that microswitch $MS_4$ operates as a safety switch in conjunction with microswitch $MS_3$.

Continued movement of the carriage 22 to the right, as shown in FIG. 1, will bring the cam 109 into engagement with the actuator of the special microswitch $SMS_8$. As may be seen in FIG. 7, the microswitch $SMS_8$ is of similar construction to the previously described special microswitch $SMS_2$ with the exception that the contacts have been reversed so that the lower pivoted section of the actuator is not effective to pivot out of the way of the cam 109 but instead causes the actuator to pivot at its upper pivot thereby opening the contacts of the switch $SMS_8$. This breaks the circuit to the coil of motor relay $MR_1$ causing the motor M to be deenergized. However, the inertia of the armature of the motor M is such that the motor coasts and thereby moves the carriage 22 along the frame 17 of the machine in FIG. 1 until the cam 109 engages the actuator of microswitch $MS_5$. The closing of the normally open contacts of switch $MS_5$ actuates the air valve $V_1$ of solenoid valve $SV_1$, FIG. 7a, for the finger closing cylinder 64 of gripper assembly 30. The closing of the contacts of microswitch $MS_5$ completes a circuit from $L_1$ through conductor 5 and switch $S_{10}$ and, thence, through conductor 10 to microswitch $MS_5$ and, thence, through conductor 9 in FIG. 7 to the coil of control relay $CR_1$ and, thence, to the other side of the line $L_2$. Upon energization of control relay $CR_1$, the contacts $a_1$ and $b_1$ thereof are closed, thus, energizing the solenoid of the solenoid valve $SV_1$. This circuit may be traced from one side of the line $L_1$ to conductor 1, as previously described, through the connection for the movable contact 2' of pressure switch $PS_1$, through the left-hand contacts $a_1$ of control relay $CR_1$ and, thence, through the solenoid coil of solenoid valve $SV_1$ to the opposite side of the line $L_2$. Control relay $CR_2$ is not energized at this time.

Shortly after the gripper fingers 78–81 of the gripper assembly 30 have been closed by the pressure cylinder 64, the pressure in the air line 115 to the pressure switch $PS_1$ will build up to a value sufficient to move the movable contact 2' thereof from its right-hand position, engaging contact 3' shown in FIG. 7a, to its left-hand position in engagement with contact 4'. This will complete a circuit through the coil of control relay $CR_2$. The circuit may be traced from one side of the line $L_2$ through the coil of control relay $CR_2$, thence, through conductor 12, through the now closed contacts of toggle switch $TS_7$ and, thence, through conductor 11 back to contact 4' of the pressure switch $PS_1$ which has now been engaged by the movable contact 2' thereof and, thence, through sections of conductors 1 and 10, switch $S_{10}$ and conductor 5 to the other side of the line $L_1$. Energization of the coil of control relay $CR_2$ causes the contacts $a_2$ and $b_2$ thereof to be closed thereby energizing the solenoid coil of solenoid valve $SV_2$ and actuating the valve $V_2$ and the pressure cylinder 65 associated therewith to lift the rear fingers of the gripper assembly 30 and move them from the position shown in phantom line in FIG. 1 and at C in FIG. 3 to the raised position shown at position D in FIG. 3. This action causes the heel of the stocking S to be moved lengthwise of the form 13, thus, breaking the heel portion of the stocking away from the heel portion of the form as shown at position D in FIG. 3. At this same time, a cam 106 on cam arm 106a, which is carried by the lower hinge member 72 of gripper assembly 30, is raised into engagement with microswitch $MS_9$ closing the latter and starting the motor M. It will be noted that the switch $MS_9$ bridges the push button contacs $PB_1$ in FIG. 7 and, thus, starts the motor M in the same manner as if the push button $PB_1$ were closed. The motor M causes the carriage 22 to move to the left as viewed in FIG. 1 and, thus, return from its phantom line position at the right-hand end of the machine to the full line position at the left-hand end of the machine in FIG. 1.

The various positions of the gripper assembly 30 are illustrated in FIG. 3. As the carriage 22 continues its return movement, the cam 109, carried thereby, will permit the contacts of microswitch $MS_5$ to return to normally open position. However, this operation has no effect upon the circuit as the right-hand contacts $b_1$ for control relay $CR_1$ complete a holding circuit for the coil of control relay $CR_1$ through the normally closed contacts of microswitch $MS_6$ in conductor 10. The circuit is open through the holding contacts $b_2$ for the control relay $CR_2$, however, there is maintained a circuit through the coil of control relay $CR_2$ by way of the now closed toggle switch $TS_7$ and contacts 4' and 2' of pressure switch $PB_1$. Thus, it will be seen that the gripper fingers 78–81 for the gripper assembly 30 continues to remain closed and the pressure cylinder 65 maintains the gripper fingers 78–81, carried by lower hinge member 72, FIG. 4, in raised position against the upper hinge member 70.

As the carriage 22 continues to move to the left under the operation of the drive motor M, the cam 109 will engage the actuator of the special microswitch $SMS_8$. However, due to the lower pivoted construction of the actuator of microswitch $SMS_8$, the contacts of that switch continue to remain closed. Thus, the drive motor M, for the carriage 22, continues to be energized and the carriage 22 continues to move to the left bringing the cam 109 into engagement with the actuator of microswitch $MS_4$. Actuation of microswitch $MS_4$ has no effect upon the circuit for the same reason as previously described above as the microswitch $MS_3$, at the loading station of the forms 13, continues to remain closed. During movement of the carriage 22 between microswitch $SMS_8$ and microswitch $MS_4$, it will be seen in FIG. 3 that the gripper assembly 30 has been turned to the position illustrated at position E bringing the stocking S into the path of the air stream from the blower $B_1$ and moving the stocking S into engagement with the deflector 68 located at the forward end of the tray 31, FIGS. 1 and 3.

As the carriage 22 continues to move to the left, the cam 107, carried thereby, will engage the toggle switch $TS_7$ causing the latter to open and move to the position shown in FIG. 7. This breaks the circuit between conductors 11 and 12, thereby breaking the circuit to the coil of control relay $CR_2$, thus, causing the contacts $a_2$ and $b_2$ of the latter to open and, thereby, break the circuit to the solenoid valve $SV_2$ which controls the pressure to the air cylinder 65 which lifts the gripper fingers of the gripper assembly 30. Continued movement of the carriage 22 to the left causes the cam 109 to engage the actuator of the special microswitch $SMS_2$ opening the contacts of the latter. This breaks the circuit to the drive motor M. The motor M coasts to a stop and during this coasting movement actuates the contacts of microswitch $MS_6$ opening the circuit in conductor 10 thereby de-energizing the coil of control relay $CR_1$. This opens the contacts $a_1$ and $b_1$ of control relay $CR_1$ which, in turn, de-energizes the solenoid of solenoid valve $SV_1$ and cuts off the pressure to the air cylinder 64, thereby permitting the fingers 78–81 of the gripper assembly 30 to move to open position as shown at position F in FIG. 3 and returning contact 2' to its original position in FIG. 7a. At this time the foot portion of the stocking S is released from the gripper assembly 30 and the foot portion will assume a substantially vertical position as shown in FIG. 3 while the leg portion thereof is positioned horizontally on the tray 31. This completes a cycle of the system and the cycle is ready to be repeated upon movement of the carriage 14' to bring a succeeding form 13 to the loading position and trip microswitch $MS_1$ as previously described.

From the foregoing description, it will be apparent that the gripper assembly 30 is adapted to remove stockings from forms and stack the stockings in piles on any suitable stocking receiving means. As the present system is automatic, it is desirable that the stocking receiving means be movable to different positions so that when a predetermined number of stockings have been placed in one pile, such pile can be moved out of stocking receiving position and a new stocking receiving means moved into position. A preferred form of stocking receiving means has been illustrated in FIGS. 1 and 2 where there is illustrated a "ferris wheel" device comprising a substantially horizontal shaft 32 having at its opposite ends a pair of wheels 33 comprising a plurality of equally spaced radial spokes 33a, the outer ends of which support the plurality of trays 31. The wheels 33 may include any number of spokes 33a depending upon the number of trays 31 to be supported thereon. For example, the wheels may be adapted to support six trays or twelve trays and in such case, the wheels would have six spokes and twelve spokes, respectively. For the sake of simplicity in the description and drawing, the wheels 33 have been illustrated as including only four spokes 33a, thus, supporting four trays 31.

In order accurately to position the top tray 31 of the stocking receiving means, there is provided a tray locating device comprising a flat sided member 116 mounted on the shaft 32, FIGS. 1 and 8. The member 116 is provided with the same number of equally spaced flat sides as the number of arms 33a on the wheels 33. As may be seen in FIG. 8, there is a bracket 117 supported by the frame of the apparatus. The bracket 117 has an arm 118 pivotally connected thereto at 119. The arm 118 includes a flat portion 118a which is adapted to engage the flat sides of member 116. The outer end of arm 118 is connected to a spring 120 which is also connected to the frame. Thus, the flat section 118a of arm 118 is adapted to be biased against the flat sides of the rotatable member 116. When the shaft 32 is rotated to move the ferris wheel and bring a new tray into position, the succeeding flat side on the member 116 will move against the portion 118a on arm 118 and stop the succeeding tray in its proper position beneath the gripper assembly 30.

While the shaft 32 may be rotated manually, it is preferably driven from a power source such, for example, as a motor $M_3$ as shown in FIG. 9. As may be seen in FIG. 9, the motor $M_3$ is provided with a gear box 121 having an output shaft 122 on which is mounted a sprocket wheel 123. A sprocket chain 124 passes around the sprocket wheel 123 and also around a sprocket wheel 125 carried by the ferris wheel shaft 32. The foregoing drive assembly for shaft 32 is supported by a bracket 126 which, in turn, is supported by one of the brackets 35 of the frame of the apparatus as shown in FIG. 1. The bracket 126 is also adapted to support a depending arm 128 which, in turn, supports a normally closed microswitch $MS_{11}$ which is adapted to control the operation of the tray drive motor $M_3$. The spokes 33a of the wheel 33 adjacent the motor $M_3$ are provided with cams 33b which are adapted to engage the microswitch $MS_{11}$ and stop the motor when a tray has moved into proper position to receive stockings from the gripper assembly 30. Once the tray drive motor $M_3$ has been shut off, the tray locating device comprising the flat sided member 116 and the cooperating lever arm 118 functions as a break to stop the ferris wheel in correct position with the top tray beneath the gripper assembly 30. The arm 128 may be adjusted relative to the ferris wheel depending upon the time required to bring the motor $M_3$ to a stop.

As may be seen in FIGS. 7 and 7a, the motor $M_3$ for the ferris wheel has been connected in circuit with control relay $CR_3$ between lines $L_1$ and $L_2$. To start the motor $M_3$ after it has been stopped, there is provided a microswitch $MS_{10}$ which is normally open and is supported beneath the folding table 130, FIG. 1, on which the hosiery is folded and stacked after being removed from the collecting trays. An operating bar 131 is pivotally mounted at 132 beneath the folding table 130 and is adapted to be moved into engagement with the microswitch $MS_{10}$. The bar 131 is so positioned, FIG. 2, that the operator may push his body against the edge of the table 130 and the end of the bar 131 opposite from the pivot 132 and cause the bar 131 to operate the microswitch $MS_{10}$. Thus, when the operator is removing the hosiery from the filled ferris wheel, he may make it turn one tray at a time by pushing his body against the bar 131 for each tray movement desired. It will be seen in FIGS. 7 and 7a that when microswitch $MS_{10}$ is closed, it will complete a circuit from line $L_1$ through conductor 5, switches $MS_{11}$ and $MS_{10}$ through conductor 4 and, thence, through the coil of control relay $CR_3$ to the opposite side of the line $L_2$. This energizes control relay $CR_3$ and closes its contacts $a_3$ and $b_3$ to start the tray drive motor $M_3$. The motor $M_3$ continues to run after microswitch $MS_{10}$ is opened due to the holding circuit for control relay $CR_3$ through the now closed contacts $a_3$. The tray motor $M_3$ remains energized unil the microswitch $MS_{11}$ has been opened by a cam $33b$ on the next one of the tray spokes $33a$, FIG. 2. This opens the holding circuit to control relay $CR_3$, thus, opening the contacts $b_3$ in the tray motor circuit.

While the present apparatus includes provision for the operator to control the tray drive motor $M_3$, provision is also made in the system for automatic control of the tray drive motor $M_3$ by the form movement mechanism. As pointed out above, the present system is particularly adapted for use with a form movement system of the type disclosed in Patent 3,091,377. Such a form movement system has been shown in FIGS. 10 and 11 herein which correspond to FIGS. 2 and 3 in the aforesaid Patent 3,091,377 with corresponding parts identified herein by the same reference characters but additionally including a prime.

Thus, as may be seen in FIG. 10, there is provided a carriage ring or form holder ring 14' which has pivotally mounted thereon a plurality of supports 15' which, in turn, support individual stocking forms or boards 13. This construction has previously been described generally in connection with FIG. 7. The form actuating mechanism 30' includes a stationary cam 31' in the form of a curved, inclined bar which is adapted to be received within recesses 15a' disposed on the under side of the form supports 15'. As the form actuating mechanism 30' is raised to its upper position, the cam 31' is adapted to tilt the respective form supports 15'. The inclined cam 31' remains stationary while the carriage or form ring 14' is caused to rotate and, thus, move a form holder 15' up the incline of cam 31' and about the form holder pivot 33'. This movement is caused by the engagement of rotating cam 38' which is shaped in the form of a worm, FIGS. 10 and 11, with pins 37' on the form holders 15'. The cam 38' rotates in a counterclockwise direction as viewed from the right-hand side of FIG. 10 and is carried by a shaft 39'. The shaft 39' is provided with a sprocket wheel 40' which is driven from a motor 41' by way of a gear box 42', sprocket wheel 43' and chain 44', FIGS. 10 and 11. The rotating cam 38' is provided with a lip 38a' which is adapted to cooperate with the pins 37' on the form holders 15' and return them from their maximum tilted or stripping position to their original or normal vertical position.

As previously described in connection with FIGS. 7 and 7a, microswitches $MS_1$ and $MS_3$ are adapted to be positioned beneath the carriage ring 14'. Both of microswitches $MS_1$ and $MS_3$ are shown in FIGS. 10–12. The shaft 39' is provided with a shaft extension 140 to which are secured cams 141 and 143 which are adapted, respectively, to operate microswitches $MS_1$ and $MS_3$. As may be seen in FIG. 12, the cams 141 and 143 are positioned on the shaft extension 140 to operate the microswitches $MS_1$ and $MS_3$ in timed relation as previously described in connection with FIGS. 7 and 7a. Microswitches $MS_1$ and $MS_3$ are in the control circuit for operation of the gripper assembly 30.

Positioned beneath the carriage ring 14' is a normally open microswitch $MS_{12}$, FIGS. 10 and 11, which, as shown in FIGS. 7 and 7a, is in parallel circuit with the microswitch $MS_{10}$ across conductors 3 and 4. The microswitch $MS_{12}$ is adapted to be actuated by means of one or more cams 144 fastened under the carriage ring 14' by one of the bolts of the form holders 15'. The carriage ring 14' may support a plurality of hosiery forms such, for example, as forty-eight or sixty forms. While the form ring 14' rotates during the unloading of stockings S from the forms 13 by the gripper assembly 30, the tray motor $M_3$ is stopped and the stockings S are stacked on the top tray 31. With only one cam 144 on the ring 14', all of the stockings from the forms will be placed on the one tray. When the cam 144 engages the actuator of the microswitch $MS_{12}$, it closes the normally open contacts causing the control relay $CR_3$ to be energized and starting the tray motor $M_3$ to move the ferris wheel to bring the succeeding tray to the top or loading position. By utilizing additional cams 144 on the ring 14', less than the total number of stockings on the entire ring may be stacked on any one tray. For example, in the ferris wheel illustrated in FIG. 2, four trays 31 are utilized. With a forty-eight-form ring, four cams, similar to cam 144, equally spaced about the underside of ring 14', will stack twelve stockings on each of the four trays 31. With a sixty-form ring and four cams utilized as mentioned above, fifteen stockings will be stacked on each of the trays 31. Thus, it will be seen that with this arrangement, the number of stockings placed on the trays can be predetermined.

As previously mentioned in connection with FIGS. 4 and 5, the novel gripper assembly 30 is readily adapted for removing stockings from forms of various shapes. For example, in FIG. 15 it will be seen that the form 13' illustrated there includes a foot portion which extends at an angle with respect to the horizontal rather than parallel as on the corresponding portion of the form 13 shown in FIG. 1. With a stocking form of the shape of the form 13' in FIG. 15, it is necessary that the gripper assembly 30 be capable of lifting the heel portion of the stocking sufficiently high to clear the toe portion of the form during removal of the stocking from the form 13'. This is accomplished by moving the gripper pads 87 from their upper positions in fingers 78 and 79, as shown in FIGS. 4 and 5, to their lower positions, as shown in FIGS. 13 and 14, with the cross pins 89 of the respective pads 87 extending through the holes 78a and 79a at the lower bifurcated ends of fingers 78 and 79.

In order to provide sufficient lift for the gripper fingers 78 and 79 which grip the heel of the stocking, the gripper assembly 30 is provided with an air cylinder 65' of adequate stroke. The stroke of the air cylinder 65' is greater than the stroke required of the air cylinder 65 in FIG. 4. For example, in one installation the air cylinder 65 of FIG. 4 had a stroke of approximately two inches whereas the air cylinder 65' in FIG. 13 had a stroke of approximately three and one-half inches. The manner in which the additional length of stroke on the air cylinder 65' is utilized will now be described. As may be seen in FIGS. 13 and 14, the gripper assembly 30 is provided with a cam arm 106a' similar to the cam arm 106a in FIG. 5. The outer end of cam arm 106a' is provided with a cam 106' which is adapted to actuate the microswitch $MS_9$ in the same manner as previously described in connection with cam 106. Thus, when the air cylinder or actuator 65' is operated from the control circuit of FIGS. 7 and 7a in the manner previously described in connection with air cylinder 65, the lower hinge member 72 will be raised upwardly toward the upper hinge member 70 and cam 106' will actuate the microswitch $MS_9$ as shown in FIG. 15. However, it will be noted in FIGS. 13–15 that the arm 106a' also supports a cam roller 150. This cam roller is adapted to engage a cam 151 which is supported on the lower side of the horizontal frame 17 adjacent the microswitch $MS_9$ as shown in FIG. 15.

The cam 151, thus, limits the initial upward movement of the lower hinge member 72 of the gripper assembly 30 by the actuator 65'. The cam 151 is so shaped that it permits the actuator 65' to pull the heel of the stocking off the form 13' a short distance, for example, approximately one inch, before the cam roller 150 strikes the bottom of cam 151. At the same time the cam roller 150 engages the cam 151, the cam 106' engages the microswitch $MS_9$, thus, causing the carriage 22, supporting the gripper assembly 30, to move to the left as viewed in FIG. 15. As the gripper assembly 30 moves to the left, the cam roller 150 is adapted to roll along the cam surface of cam 151. It will be noted that the cam surface of cam 151 is shaped similar to the instep of the stocking form 13' and, thus, as the gripper assembly 30 moves to the left, the air cylinder 65' is permitted, by the cooperation of the cam 151 and the cam roller 150, to lift the rear fingers 78 and 79 of the gripper assembly higher and higher so as to clear the ball portion of the foot of the stocking form. With this arrangement, it will be seen that the gripper assembly 30 is capable of stripping stockings from a form of the shape of form 13' by lifting the heel of the stocking higher and higher and, thus, getting more clearance for the heel gripper fingers 78 and 79 of the form as the stocking moves further and further off the foot of the form 13'. The further movements of the gripper assembly 30 in FIG. 15 are similar to those previously described in connection with FIG. 3 and, thus, will not be repeated here.

As previously described in connection wtih FIG. 1, the carriage 22 may be provided with a deflector 59 which is adapted to move into engagement with the form stabilizing means comprising a pivoted guide device 60 having bifurcated ends 61 to move into position on opposite sides of the foot portion of the forms 13 and steady the form so as to insure that it will be in proper position for engagement by the gripper assembly 30. While the guide device 60 is illustrated in FIG. 1 as being carried by the horizontal frame 17 of the machine, it will be seen in FIGS. 13–15 that the gripper assembly 30 may carry such guide device. In FIGS. 13–15, form stabilizing means comprising a pair of spaced members 61' are carried at the forward end of the gripper assembly and are adapted to move into position on opposite sides of the foot portion of one of the forms and steady it prior to engagement of the form by the fingers of the gripper assembly 30.

It should be understood that the invention is not limited to the specific arrangements shown, and that changes and modifications may be made within the scope of the appended claims.

What is claimed is:

1. The method of removing a stocking from a form comprising the steps of:
   gripping the stocking at the toe and heel of the foot portion,
   pulling only the heel lengthwise of the form until the heel is free of the form, and
   concurrently pulling both the toe and heel relative to the form to remove the stocking therefrom.

2. The method of removing a stocking from a form comprising the steps of:
   gripping the stocking at the toe and heel of the foot portion,
   pulling only the heel lengthwise of the form until the heel is free of the form,
   concurrently pulling both the toe and heel away from the form,
   turning the toe and heel of the stocking through an angle toward the horizontal, and
   deflecting the leg portion of the stocking to bring the leg portion into a substantially horizontal plane as the stocking is removed from the form.

3. The method of removing a stocking from a form comprising the steps of:
   gripping the stocking at the toe and heel of the foot portion,
   pulling only the heel lengthwise of the form until the heel is free of the form,
   concurrently pulling both the toe and heel away from the form,
   turning the toe and heel of the stocking through an angle toward the horizontal,
   deflecting the leg portion of the stocking to bring the leg portion into a first substantially horizontal plane, and
   supporting the leg portion in a second substantially horizontal plane below said first plane after the stocking is removed from the form.

4. The method of removing a stocking from a form comprising the steps of:
   gripping the stocking at the toe and heel of the foot portion,
   pulling only the heel lengthwise of the form until the heel is free of the form,
   concurrently pulling both the toe and heel away from the form,
   turning the toe and heel of the stocking through an angle toward the horizontal,
   deflecting the leg portion of the stocking to bring the leg portion into a substantially horizontal plane,
   pulling the leg portion onto a substantially horizontal surface, and
   releasing the grip on the toe and heel of the foot portion after the stocking is removed from the form.

5. The method of removing a stocking from a form comprising the steps of:
   gripping the stocking at the toe and heel of the foot portion,
   pulling only the heel lengthwise of the form until the heel is free of the form,
   concurrently pulling both the toe and heel away from the form,
   turning the toe and heel of the stocking through an angle toward the horizontal,
   deflecting the leg portion of the stocking to bring the leg portion into a substantially horizontal plane,
   pulling the leg portion onto a substantially horizontal surface,
   releasing the grip on the toe and heel of the foot portion, and
   dropping the foot portion beyond the horizontal surface so that at least the toe of the foot portion hangs below the leg portion.

6. The method of removing a stocking from a form according to claim 5 including the step of directing a controlled air stream against the stocking concurrently with said deflecting of the leg portion.

7. The method of removing a stocking from a form according to claim 1 including the step of directing a controlled air stream against the stocking as it is removed from the form to provide uniform air flow conditions to counteract any disturbing air flow for uniform controlled movement of the stocking.

8. The method of stacking stockings in a pile comprising the steps of:
   gripping the foot portion of a stocking,
   pulling the foot portion until the leg portion of the stocking moves into a substantially horizontal plane,
   supporting the leg portion of the stocking in a plane so that the leg portion is laying flat,
   releasing the grip on the foot portion of the stocking, and
   dropping the foot portion of the stocking beyond the leg portion so that at least the toe of the foot portion hangs below the leg portion.

9. Apparatus for removing stockings from forms comprising:
   supporting means,
   a carriage movable along said supporting means,
   gripping means carried by said carriage for gripping the foot portion of a stocking while on a non-horizontal form,
   means for actuating said gripping means to grip the stocking,
   means for pivoting said gripping means about one end thereof,
   means for guiding said gripping means along a predetermined path to remove the stocking from the form,
   deflecting means spaced from and in alignment with said predetermined path for engaging the leg portion of the stocking to position the leg portion in a substantially horizontal plane, and means for releasing said gripping means with respect to the stocking when the leg portion of the stocking has been moved into a substantially horizontal plane.

10. Apparatus for removing stockings from forms according to claim 9 wherein said means for guiding said gripping means along a predetermined path includes:
cam means carried by said supporting means, and
cam follower means connected to said gripping means and engageable with said cam means.

11. Apparatus for removing stockings from forms according to claim 9 including:
means positioned along said predetermined path for directing a controlled air blast against the stocking as it engages said deflecting means.

12. Apparatus for removing stockings from forms according to claim 9 including:
form stabilizing means cooperating with said gripping means, said form stabilizing means being movable by said gripping means into positions on opposite sides of a form to stabilize the latter preparatory to gripping of the foot portion of the stocking by said gripping means.

13. Apparatus for removing stockings from forms according to claim 9 including:
stocking receiving means positioned beneath said supporting means, said stocking receiving means having a cut-out portion at one end thereof for receiving the foot portion of the stocking while supporting the leg portion of the stocking in the flat.

14. Apparatus for removing stockings from forms according to claim 13 wherein said stocking receiving means comprises at least one tray, and means for supporting said tray beneath said supporting means.

15. Apparatus for removing stockings from forms according to claim 14 wherein the end of said tray opposite from said cut-out portion is positioned adjacent said deflecting means for engaging the leg portion of the stocking to position the leg portion in a substantially horizontal plane.

16. Apparatus for removing stockings from forms according to claim 14 wherein said stocking receiving means comprises a plurality of trays, and means for moving said trays into stocking receiving position.

17. Apparatus for removing stockings from forms comprising:
supporting means,
gripping means carried by said supporting means,
means for actuating said gripping means into engagement with the foot portion of a stocking while on a non-horizontal form,
means for moving said gripping means along a predetermined path for removal of the stocking from the form to a substantially horizontal position,
stocking receiving means positioned beneath said supporting means, and
means for moving said stocking receiving means into a substantially horizontal receiving position.

18. Apparatus for removing stockings from forms according to claim 17 wherein said stocking receiving means comprises:
a plurality of trays supported for movement into stocking receiving position, and
said means for moving said stocking receiving means into stocking receiving position comprises a motor.

19. Apparatus for removing stockings from forms according to claim 18 including means for controlling the operation of said motor to predetermine the number of stockings deposited on said trays.

20. Apparatus for removing stockings from forms and stacking the stockings in predetermined piles comprising:
a carriage track,
form receiving means adjacent one end of said track and adapted to receive a plurality of stocking forms,
a carriage movable along said track,
means for driving said carriage along said track,
stocking gripping means carried by said carriage,
control circuit means for controlling said carriage driving means and said stocking gripping means sequentially to remove stockings from the forms,
stocking receiving means positioned beneath said track and adapted to receive stockings in the flat from said stocking gripping means, and
means controlled by said form receiving means and connected in electrical circuit with said stocking receiving means to adjust the position of the latter and thereby control the number of stockings in any one pile on said stocking receiving means.

21. Apparatus for removing a stocking from a form including a gripper assembly comprising:
a hinge device having a pair of members pivotally connected at one of their ends,
support means connected to one of said members,
at least one pair of gripper fingers carried by the other of said members,
means for actuating said gripper fingers between open and closed positions, and
means disposed at the end of said pair of members remote from the pivotal connection for opening and closing said pair of members of said hinge device.

22. Apparatus for removing a stocking from a form according to claim 21 including:
two pairs of gripper fingers carried by the other of said members, one of said pairs of gripper fingers being disposed at a location remote from the pivotal connection of said hinge device for engagement with the heel portion of a stocking.

23. Apparatus for removing a stocking from a form including a gripper assembly comprising:
supporting means,
two pairs of gripper fingers pivotally carried by said supporting means,
structure interconnecting one gripper finger of each pair,
spring means carried by said structure for biasing said pairs of gripper fingers to open position, and
actuator means carried by said structure for moving said gripper fingers to closed position against the bias of said spring means.

24. Apparatus according to claim 23 wherein the upper end of one of said gripper fingers in each pair includes a cam roller and the corresponding end of said other gripper finger in each pair includes a cam surface shaped to receive said cam roller.

25. Apparatus according to claim 23 wherein said structure interconnecting said gripper fingers includes:
arcuate bearing surfaces, and
said spring means is provided at the opposite ends thereof with bearing members, said bearing members being shaped in the form of segments of a circular disc and having curved surfaces adapted to ride in said arcuate bearing surfaces, said curved surfaces having a smaller radius than said arcuate bearing surfaces.

26. Apparatus for removing stockings from forms comprising:
a horizontal support,
a carriage movable along said horizontal support,
means for driving said carriage along said support,
stocking gripping means carried by said carriage,
a control circuit for said means for driving said carriage and said gripping means, said control circuit including a plurality of switch means carried by said horizontal support and connected in circuit with said control circuit, and
cam means carried by said carriage for operating said switch means to control movement of said carriage and said gripping means along said horizontal support.

27. Apparatus for removing stockings from forms comprising:
a horizontal support,
a carriage movable along said horizontal support,
means for driving said carriage along said support,
stocking gripping means carried by said carriage,
a control circuit for said means for driving said carriage and said gripping means, said control circuit including a plurality of switch means carried by said horizontal support and connected in circuit with said control circuit,
cam means carried by said carriage for operating said switch means to control movement of said carriage and said gripping means along said horizontal support,
means for pivoting said gripping means about one end thereof, and
cam means carried by said gripping means for actuating one of said switch means to control said driving means for said carriage.

28. Apparatus for removing stockings from forms according to claim 9 including:
pneumatic means in circuit with said means for actuating said gripping means and said means for pivoting said gripping means to operate said actuating means and said pivoting means in predetermined time sequence.

29. Apparatus for removing stockings from forms comprising:
supporting means,
gripping means carried by said supporting means,
means for actuating said gripping means into engagement with the foot portion of a stocking,
means for moving said gripping means along a predetermined path for removal of the stocking from a form, and
means along said predetermined path for directing a controlled air blast against the stocking as it is being removed from the form to provide a controlled movement of the leg portion of the stocking and counteract any uncontrolled disturbing air flow.

30. Apparatus for removing stockings from forms comprising:
a horizontal support,
a carriage movable along said horizontal support,
means for driving said carriage along said support,
stocking gripping means carried by said carriage,
a control circuit for said means for driving said carriage and said gripping means, said control circuit including a plurality of switch means carried by said horizontal support and connected in circuit with said control circuit,
cam means carried by said carriage for operating said switch means to control movement of said carriage and said gripping means along said horizontal support,
stocking receiving means positioned beneath said horizontal support,
means for positioning said stocking receiving means relative to said gripping means, and
means connecting said positioning means in said control circuit with said driving means for said carriage and said gripping means.

31. Apparatus for removing a stocking from a form according to claim 22 wherein said one pair of gripper fingers adapted for engagement with the heel portion of a stocking includes means to adjust the length thereof to accommodate stocking forms of different shapes.

32. Apparatus for removing stockings from forms comprising:
a horizontal support,
a carriage movable along said horizontal support,
means for driving said carriage along said support,
stocking gripping means carried by said carriage,
a control circuit for said means for driving said carriage and said gripping means, said control circuit including a plurality of switch means carried by said horizontal support and connected in circuit with said control circuit,
cam means carried by said carriage for operating said switch means to control movement of said carriage and said gripping means along said horizontal support,
means for pivoting said gripping means about one end thereof,
means for adjusting said gripping means to accommodate stocking forms of different shapes, and
cam means carried by said horizontal support and engageable with said gripping means during the pivotal movement of said gripping means about said one end thereof to insure that said gripping means clears the foot portion of the form during removal of the stocking therefrom.

33. In a system for removing stockings from forms and stacking the stockings in predetermined piles, the subcombination comprising:
a pair of wheels each including a plurality of spokes extending from a central axis of the respective wheels,
means supporting said wheels in spaced relation to each other for rotation of the wheels about a substantially horizontal axis passing through said central axis of each wheel,
a plurality of tray means supported between the corresponding spokes of the respective wheels, and
means positioned relative to one of said wheels for guiding a stocking over said one wheel and into one of said tray means.

34. In a system for removing stockings from forms and stacking the stockings in predetermined piles, the subcombination comprising:
a pair of wheels each including a plurality of spokes extending from a central axis of the respective wheels,
means supporting said wheels in spaced relation to each other for rotation of the wheels about a substantially horizontal axis passing through said central axis of each wheel,
a plurality of tray means supported between the corresponding spokes of the respective wheels,
means positioned adjacent one of said wheels for guiding a stacking into one of said tray means,
means for rotating said pair of wheels to move said tray means to different positions about said central axis of the respective wheels, and stop means effective on at least one of said wheels to position said tray means in a predetermined position relative to said means for guiding a stocking.

References Cited

UNITED STATES PATENTS

| 300,203 | 6/1884 | Bowman | 198—211 X |
|---|---|---|---|
| 1,126,619 | 1/1915 | Coulston et al. | 223—112 |
| 1,141,778 | 6/1915 | Coulston et al. | 223—112 |
| 1,167,730 | 1/1916 | Wagner et al. | 214—6 |
| 1,630,456 | 5/1927 | Wehr | 294—88 |
| 2,722,348 | 11/1955 | Ammon | 223—43 |
| 3,029,957 | 4/1962 | Freeman et al. | 214—1 |
| 3,054,542 | 9/1962 | Glaze et al. | 223—112 |
| 3,091,377 | 5/1963 | Brewin | 223—112 |
| 3,233,750 | 2/1966 | Bannon | 214—1 |
| 3,237,980 | 3/1966 | Helms | 294—88 |

FOREIGN PATENTS 277,645 12/1951 Switzerland.

JORDAN FRANKLIN, *Primary Examiner.*

G. KRIZMANICH, *Assistant Examiner.*

UNITED STATES PATENT OFFICE
CERTIFICATE OF CORRECTION

Patent No. 3,355,074  November 28, 1967

Grant H. Brewin et al.

It is certified that error appears in the above identified patent and that said Letters Patent are hereby corrected as shown below:

Column 4, line 21, strike out "to the free end of cam track section 45 and to a sta-" and insert instead -- by pivots 48 and 49 and a separate cam track --; column 8, line 73, strike out "moves a form 13 to the loading station" and insert instead -- has been moved to the unloading station. --; column 11, line 5, for "continues" read -- continue --; column 20, line 49, for "stacking" read -- stocking --.

Signed and sealed this 24th day of June 1969.

(SEAL)
Attest:

Edward M. Fletcher, Jr.  WILLIAM E. SCHUYLER, JR.
Attesting Officer  Commissioner of Patents